F. A. GORDON.
AUTOMOBILE SEAT.
APPLICATION FILED DEC. 15, 1917.
1,289,442.
Patented Dec. 31, 1918.
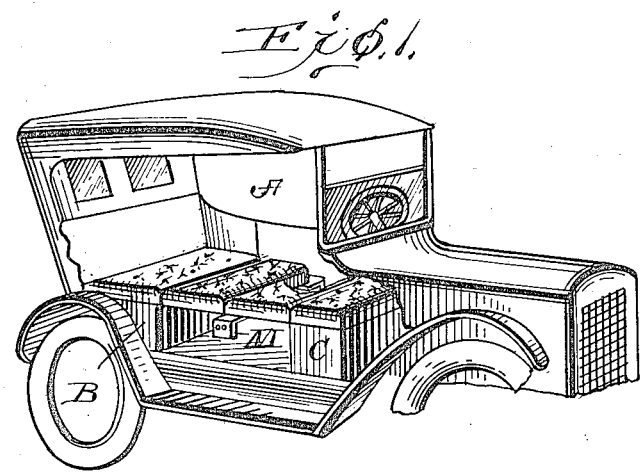
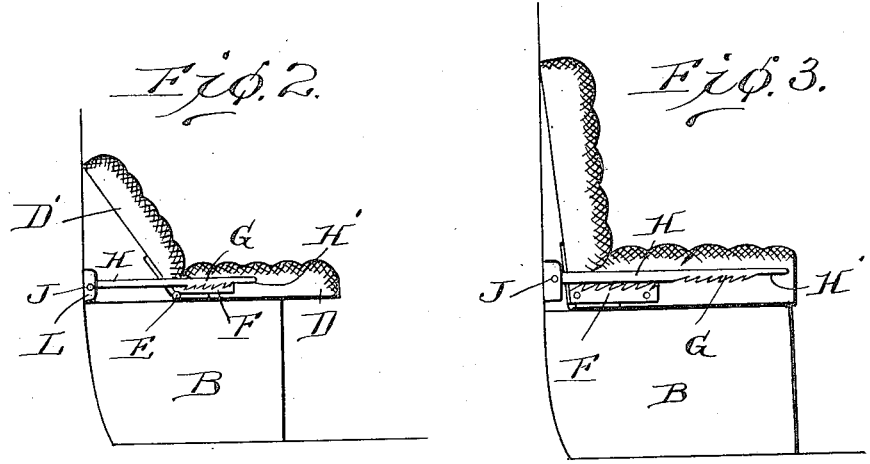

UNITED STATES PATENT OFFICE.

FRED A. GORDON, OF OMAHA, NEBRASKA

AUTOMOBILE-SEAT.

1,289,442.   Specification of Letters Patent.   Patented Dec. 31, 1918.

Application filed December 15, 1917. Serial No. 207,250.

*To all whom it may concern:*

Be it known that I, FRED A. GORDON, a citizen of the United States, residing at Omaha, in the county of Douglas and State of Nebraska, have invented certain new and useful Improvements in Automobile-Seats, of which the following is a specification.

My invention relates to improvements in automobile seats, the main object being the provision of a seat which will perform the function of a seat as well as a bed, as circumstances require, and which will be thoroughly efficient and practical for either purpose.

With this object in view, my invention consists of an automobile seat embodying novel features of construction and combination of parts for service substantially as disclosed herein.

Figure 1 represents a perspective view of my invention with the parts in the position they occupy when providing a bed, the automobile being also illustrated to show the manner of using my improvement.

Fig. 2 represents an end view of one of the seats, showing the manner of adjusting the seat to a reclining position, and Fig. 3 represents a similar view, with the seat in normal position.

In the drawings, the letter A designates the automobile, B designates the support for the rear seat, and C designates the support for the front seat, my improvements being applied to said supports, and consisting of the two seat sections forming the front and rear seats, said sections each composed of the seat member D and the back member D', each provided with hinges E, and each further carrying a rack bar F, with which is adapted to engage the rack G, carried or formed on the forward portion of the hand levers H, whose handle end H' is free and whose other end is pivoted at J, to the plate L, rigidly secured.

In use, as will be seen from Figs. 2 and 3, the lever and rack construction allows the back of the seat to be inclined or to be sustained in normal position to form a seat to suit the user, and when necessary to provide a bed, the four sections are dropped to a horizontal position, as shown in Fig. 1, the seat of the forward section resting upon one of the supports, with the back of the rear section resting on the other support and the two other seat and back sections forming the intermediate portion of the bed, and resting on supporting brackets M, thus making a horizontal cushioned support and providing a convenient and comfortable bed.

From the foregoing description, taken in connection with the drawings, it will be noted that the seat members may be adjusted to provide seats to suit any person, or a bed may be quickly provided, and further that the improvements produce a practical and efficient invention while adding very little to the cost.

I claim:

In combination with the body of an automobile, front and rear supports in said body, a front seat composed of a seat and back section hinged together and adapted to have the back section fall to the horizontal line of the seat section, brackets in the body to support said back section in horizontal position, and a rear seat and back section hinged together and adapted to rest upon the rear support, a horizontally disposed rack secured to the horizontal seat section, and a hand lever having one end pivoted to the body and formed with teeth on one edge near its other end to engage the said rack to adjust the back section with reference to the seat section.

In testimony whereof I affix my signature in the presence of two witnesses.

FRED A. GORDON.

Witnesses:
J. W. MARTIN,
J. H. MALONE.